J. ASHCROFT.
Steam Cooking-Stove.

No. 213,029. Patented Mar. 11, 1879.

Witnesses:
James Nich.s Callan
M. S. Callan

Inventor:
John Ashcroft

J. ASHCROFT.
Steam Cooking-Stove.

No. 213,029. Patented Mar. 11, 1879.

Witnesses:
James Nichˢ Callan
M. S. Callan

Inventor:
John Ashcroft

UNITED STATES PATENT OFFICE.

JOHN ASHCROFT, OF BROOKLYN, NEW YORK.

IMPROVEMENT IN STEAM COOKING-STOVES.

Specification forming part of Letters Patent No. 213,029, dated March 11, 1879; application filed September 20, 1878.

*To all whom it may concern:*

Be it known that I, JOHN ASHCROFT, of Brooklyn, in the county of Kings and State of New York, have invented certain new and useful Improvements in Steam Cooking-Stoves; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to improvements in steam cooking-stoves for which a patent was granted me April 4, 1871, No. 113,241, in which animal and vegetable food is baked, roasted, browned, broiled, and cooked ready for table use; and it consists in the peculiar arrangement of parts by which the food to be cooked, browned, and baked is designed to be put in immediate or direct contact with the metallic surface, which surface is, on its opposite side, exposed to the immediate and direct contact with the live steam circulating between the roasting-plates of the oven and their outer jacket.

It also consists in the combination of parts by which the process of browning the contents of said oven is carried into effect, retaining all the nutritious properties, nourishing-juices, &c., otherwise wasted in vapor or dried up.

It further consists in combining, with the jacketed cooking-oven, meat-juice traps, steam or water traps, and steam-connections, which will hereinafter be more fully described.

In order that my invention may be more fully understood, I will now proceed to describe it in detail.

Figure 1:
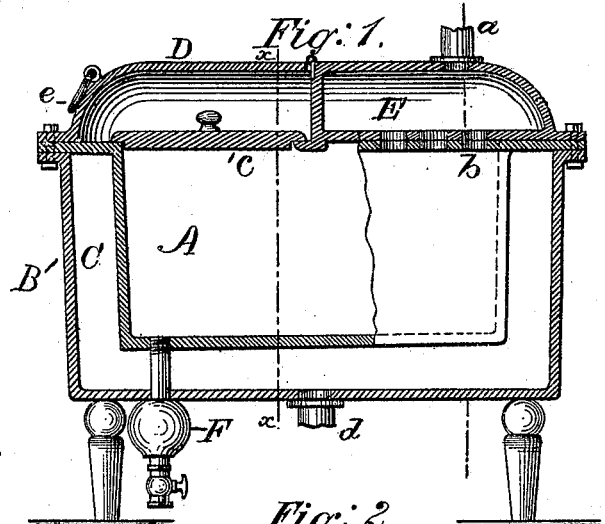

Referring to the accompanying sheets of drawings, Figure 1 illustrates a longitudinal sectional elevation of my improved cooking-oven, provided only with one chamber.

A indicates the oven, surrounded by the jacket B. C is the steam-space; D, the top or cover. It will be observed that the said cover is divided by a transverse partition, making two chambers. One of these chambers, E, is the steam-reception chamber. The steam being received through inlet-pipe *a* passes down through perforations *b* into the steam-space C.

It will be observed that the upper half of the top of the oven is subjected to the same steam-heat as its sides and bottom, thus exposing nearly the entire oven to the heat. The other portion of the lid or cover forms a dead-air space, for the purpose of preventing radiation of heat. *c* is the lid to the oven by which access to its interior is provided for.

Figure 4:
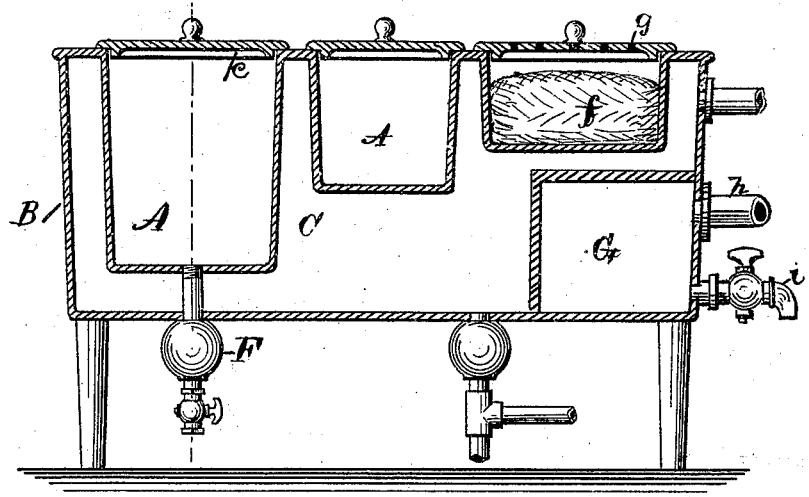
Figure 5:
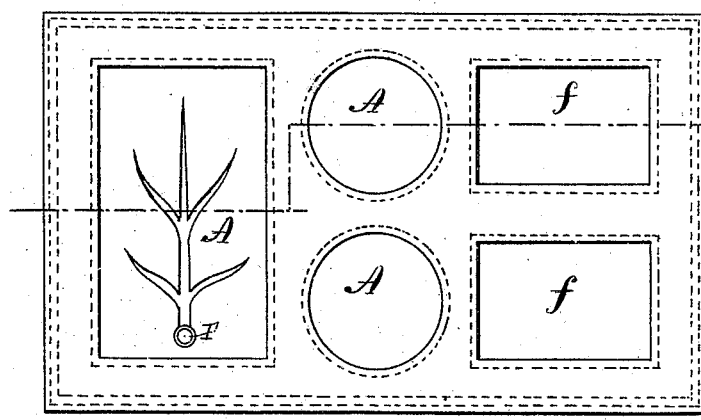
Figure 6:
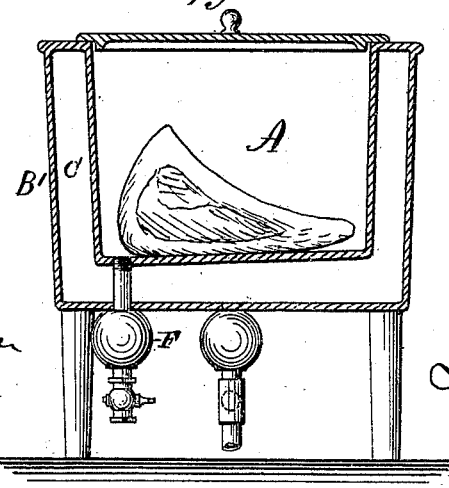

F in this figure is the meat-juice trap or receptacle, and receives the juice as it drips and runs down the grooves (shown in Figs. 2 and 5) in the bottom of the oven. This trap F is provided with a small cock, by which the juices are drawn off for use. *d* is the pipe for the escape of steam and water of condensation, to which a steam or water trap may be attached, as shown by Figs. 4 and 6. The lid D is hinged about its center, and is raised and lowered by a handle, *e*.

Figure 2:
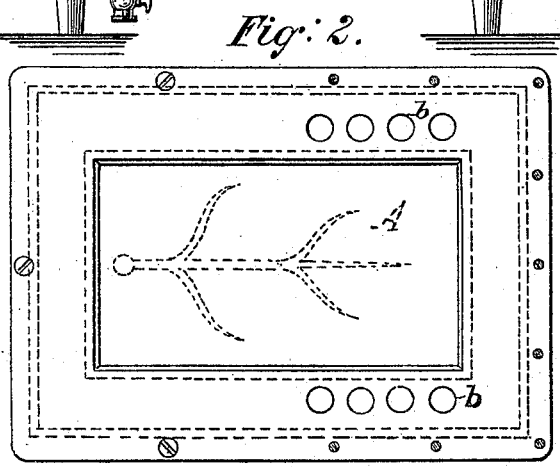

Fig. 2 represents a plan view of the oven with its top or lid removed, showing a series of perforations, *b*, for the inlet of steam.

The steam, rushing in from the upper steam-chamber through a series of jets, produces a better impinging effect of heat upon the heating-surface than it would have through a single aperture. The grooves for conveying the juices or gravy are shown in the bottom of the oven in dotted lines. This figure, also, is intended to show the oven capable of use without the lid, the steam to be supplied by other means.

Figure 3:
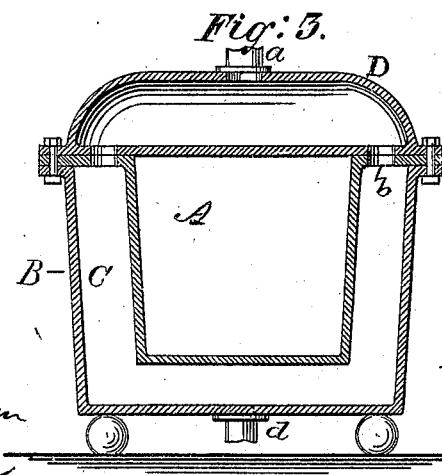

Fig. 3 illustrates a vertical sectional view of Fig. 1 on a line through the lid of the steam-chamber. Figs. 4 and 6 represent the manner of cooking various kinds of food in closed vessels in one apparatus, so that the full strength of their nutritious substances is retained, and every article is cooked by itself in a separate apartment, and cannot possibly impart any of its flavor to other articles cooking at the same time. It is evident that as many ovens or pots for cooking may be constructed in one apparatus as may be required. In Fig. 4 is also shown a bread-baking oven, *f*, the lid of which is provided with perforations *g* for the escape of moisture or vapor arising from the bread during its baking or browning process. It also shows a water-heating vessel, G, provided with inlet and outlet devices *h* and *i*. The importance of a continual supply of hot water is too well known to require any further notice in this specification. This figure also shows the meat-juice and steam traps, the functions of which have been heretofore described.

Fig. 4 represents a longitudinal vertical section. Fig. 5 is a plan view of Fig. 4, showing two bread-ovens, and also the grooved or corrugated bottom of the cooking-oven, as well as other food-cooking receptacles. Fig. 6 is a vertical section of the end of the cooking apparatus, in which the principal oven is located. A cut of beef is shown resting on the immediate bottom of the oven. It will be observed that the bottom of the oven is on an incline from a horizontal plane, for the purpose of more readily carrying off the drippings from the meat. This figure also shows the traps before alluded to.

The steam-trap is so arranged that a continuous circulation of steam may be kept up, or the steam-space may be charged with steam at a low temperature and in a quiescent state.

It is important that the juices be drawn off as they drip from the meat, so that the heat will have full effect in browning it, since, if they are allowed to remain in the oven, they absorb the dry heat to a greater or less extent.

Among the many advantages of my improved steam cooking apparatus I will briefly state the following: that the best and most nutritious parts of all meats and vegetables are saved; that they cannot be injured or destroyed by burning or otherwise while cooking; that every article cooked by this method is healthy and palatable, and the natural flavor is preserved without one article having the flavor of another, though cooked at the same time; and the most important of all is, that when the meat is baked or roasted it is handsomely browned and incrusted with a crisp coating, whereby the meat is made to maintain its natural juices.

I am aware that many attempts have been made to perfectly roast, bake, and cook food by steam, but as far as I can learn none have succeeded; and I am not aware that any attempt was ever made by such means to incrust and brown the meat or bread before the present invention.

Heretofore all meats and vegetables were put into pans or dishes and then inserted into the oven, and when cooked they had the appearance of boiled meats, and had to be put into a hot-air oven to give them the appearance of roasted or browned meats. With mine the articles of food are laid directly on the bottom of the oven itself, with the steam in immediate contact with the opposite side of the oven, and herein lie my discovery and invention.

I am aware that it is not new to broil meat upon a steam-coil grid, and do not claim such, as the said grid is exposed to the atmosphere and will not bake nor roast meat nor bread in lump, and will not therefore perform the functions to which mine is adapted.

Having described my invention, its construction, and principles of operation, what I claim as new, and desire to secure by Letters Patent, is—

1. The process herein described of roasting, baking, and browning animal and vegetable food, which consists in, first, heating a close oven by surrounding, or nearly so, it with steam of a temperature of about 150° Fahrenheit, then placing the articles to be cooked therein in direct contact with the corrugated metallic surface, then applying additional steam heat, and then removing the juices by means of a trap without atmospheric communication, thus keeping said metallic surface dry, whereby the articles to be cooked become incrustated and browned, substantially in the manner set forth.

2. The combination, with a roasting-oven nearly surrounded by steam, of a meat-juice trap, so connected to the bottom of the oven that atmospheric communication between the trap and the oven is prevented, by which the oven is kept free of dripping liquids, and thereby causing the meat to have the full effect of the dry heat, by which it becomes browned, substantially as set forth.

3. In combination with a steam cooking and roasting apparatus, the partitioned lid or cover D, forming the steam-chamber E and dead-air chamber, constructed to operate in the manner set forth and described.

4. A steam cooking-oven and roasting apparatus, the oven of which is provided with an inclined corrugated or grooved bottom, the outer surface being surrounded with steam, or nearly so, and a partial dead-air space, for the purpose set forth and described.

5. A steam cooking and roasting apparatus consisting of the roasting and baking ovens, water-heating chambers, and meat-juice and steam traps, the said ovens and chambers being surrounded by an outer jacket and steam heating-space and covering-lid, all combined and arranged to operate in the manner set forth and described.

In testimony that I claim the foregoing as my own I affix my signature in presence of two witnesses.

JOHN ASHCROFT.

Witnesses:
 JAMES NICHS. CALLAN,
 M. S. CALLAN.